Jan. 16, 1934.  W. BAUERSFELD  1,943,511
APPARATUS FOR PROJECTING LUMINOUS DASHES AND DOTS ON A DARK GROUND
Filed Oct. 17, 1932
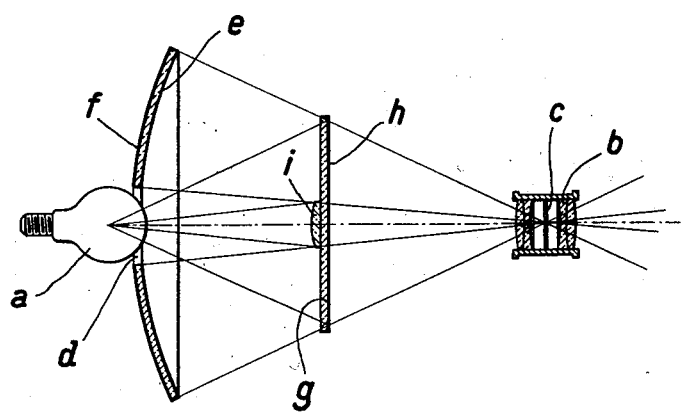
Inventor:
Walther Bauersfeld.

Patented Jan. 16, 1934

1,943,511

UNITED STATES PATENT OFFICE 1,943,511

APPARATUS FOR PROJECTING LUMINOUS DASHES AND DOTS ON A DARK GROUND

Walther Bauersfeld, Jena, Germany, assignor to the firm Carl Zeiss, Jena, Germany Application October 17, 1932, Serial No. 638,154, and in Germany October 20, 1931

4 Claims. (Cl. 88—24)

I have filed an application in Germany, October 20, 1931.

In diascopic projection of luminous linear and punctiform objects on a dark ground by means of the usual diapositives, in which the dashes and dots are permeable to light and in which the ground is as opaque as possible, the rather great image angles in question require the use of costly condensers of aspherical lenses or reflectors.

The present invention provides a way in which it is possible to image such objects in a satisfactory manner by means of a projection apparatus in the construction of which any costly constructional parts are avoided. The object carriers are represented by plane transparent object plates one surface of which has a reflecting layer, the objects themselves being provided by scraping or etching this layer. Objects of the said kind may be projected by means of a projection apparatus comprising a projection objective, a source of light and a concave reflector, in which, according to the invention, the virtual image of the source of light produced by the reflecting layer of the object plate is imaged by the concave reflector approximately in the entrance pupil of the projection objective. Not the source of light itself but an image of the same representing the object to be imaged by the concave reflector, this concave reflector may be so disposed in the apparatus that its reflecting surface does not receive any direct light from the light source.

As a concave reflector may be used, first of all, a reflector of the form of an ellipsoid of rotation which is so disposed that one of its foci is the locus of the virtual image of the source of light, and that the other of its foci lies in the entrance pupil of the projection objective. It is advisable however, to use as an ellipsoidal reflector the special case of the spherical reflector, as a consequence whereof the virtual image produced by the reflecting layer of the object plate coincides approximately with the real image produced by the concave reflector. For this reason, the apparatus must be so designed that the virtual image of the source of light and, consequently, also the entrance pupil of the projection objective are at the locus of the spherical centre of the concave reflector.

Using a source of light entails the disadvantage that part of the concave reflector may not participate in imaging, since, according to whether the source of light is in front of or behind the concave reflector, it either prevents part of the reflected rays from striking the concave reflector or is to give free passage to the rays it directs to the object plate. As a consequence, the corresponding part of the object plate is illuminated less than the remaining part and, under circumstances, may practically not partake of the projection at all. However, this unequality may be compensated approximately by an optical system disposed in the neighbourhood of the object plate, this optical system being so constructed that it produces a real image of the source of light approximately in the entrance pupil of the projection objective and that its free aperture corresponds more or less to the cross section of that part of the light pencil reflected by the concave reflector whose loss is due to the source of light.

The accompanying drawing represents in a schematical central section a constructional example of a projection apparatus according to the invention.

The apparatus has a glow-lamp $a$, which represents the source of light, and a projection objective $b$ with an interior diaphragm $c$ which is approximately at the locus of the entrance and the exit pupil. The bulb of the glow lamp $a$ extends into the central aperture $d$ of a concave glass reflector $e$ which is spherical and has a reflecting exterior surface $f$. The spherical centre of the concave reflector $e$ lies in the plane of the diaphragm $c$. A plano-parallel glass plate $g$ represents the object plate. The surface $h$ of this plate $g$, which faces the projection objective $b$, has a reflecting layer into which are scraped the dashes and dots representing the object, the object plate being transparent at these places. The silvered surface $h$ of the glass plate $g$ divides the distance between the incandescent filament of the lamp $a$ and the plane of the diaphragm $c$ into equal parts. On that side of the glass plate $g$ which faces the source of light $a$, a converging lens $i$ is disposed in the central part of the light cone, this lens $i$ having such a focal length that the incandescent filament is imaged in the plane of the diaphragm $c$. The lens diameter corresponds to the diameter of the cone sector at the locus of the lens $i$, which is determined by the aperture $d$.

When using the apparatus, the concave reflector $e$ is struck only by reflected rays of the source of light $a$, that is to say by rays that appear to emanate from the virtual image of the incandescent filament produced by the reflecting surface $h$ and lying in the plane of the diaphragm $c$. These rays are reflected back along themselves by the surface $f$ and converged to a real image of the incandescent filament, this real image coinciding with the virtual image in the plane of the diaphragm c. The projection objective b images in the known manner the surface h of the object plate g on the projection screen which is disposed at a suitable distance. The entire pencil of imaging rays emitted by the objective b corresponds to the pencil of rays which is reflected by the surface f and strikes the surface h.

I claim:

1. An apparatus for projecting linear and punctiform perforations in a reflecting layer of a plane transparent object plate, comprising a projection objective, a source of light and a concave reflector, a central light entrance aperture provided in the concave reflector, the source of light being located in front of the said light entrance aperture and outside the said concave reflector, the object plate being disposed between the source of light and the projection objective and facing the source of light with its reflecting layer, the said parts being so arranged that the concave reflector produces approximately in the entrance pupil of the projection objective a real image of the virtual image of the source of light produced by the reflecting layer of the object plate.

2. An apparatus for projecting linear and punctiform perforations in a reflecting layer of a plane transparent object plate, comprising a projection objective, a source of light and a spherical concave reflector, a central light entrance aperture provided in the concave reflector, the source of light being located in front of the said light entrance aperture and outside the said concave reflector, the centre of curvature of this concave reflector coinciding approximately with the entrance pupil of the projection objective, the object plate being disposed in the middle between the source of light and the projection objective and facing the source of light with its reflecting layer.

3. In an apparatus according to claim 1, an optical system provided in the neighbourhood of the object plate, in the centre of same, this optical system being adapted to produce a real image of the source of light approximately in the entrance pupil of the projection objective.

4. In an apparatus according to claim 1, a converging lens cemented to the centre of the object plate and adapted to produce a real image of the source of light approximately in the entrance pupil of the projection objective.

WALTHER BAUERSFELD.